United States Patent Office 3,464,759
Patented Sept. 2, 1969

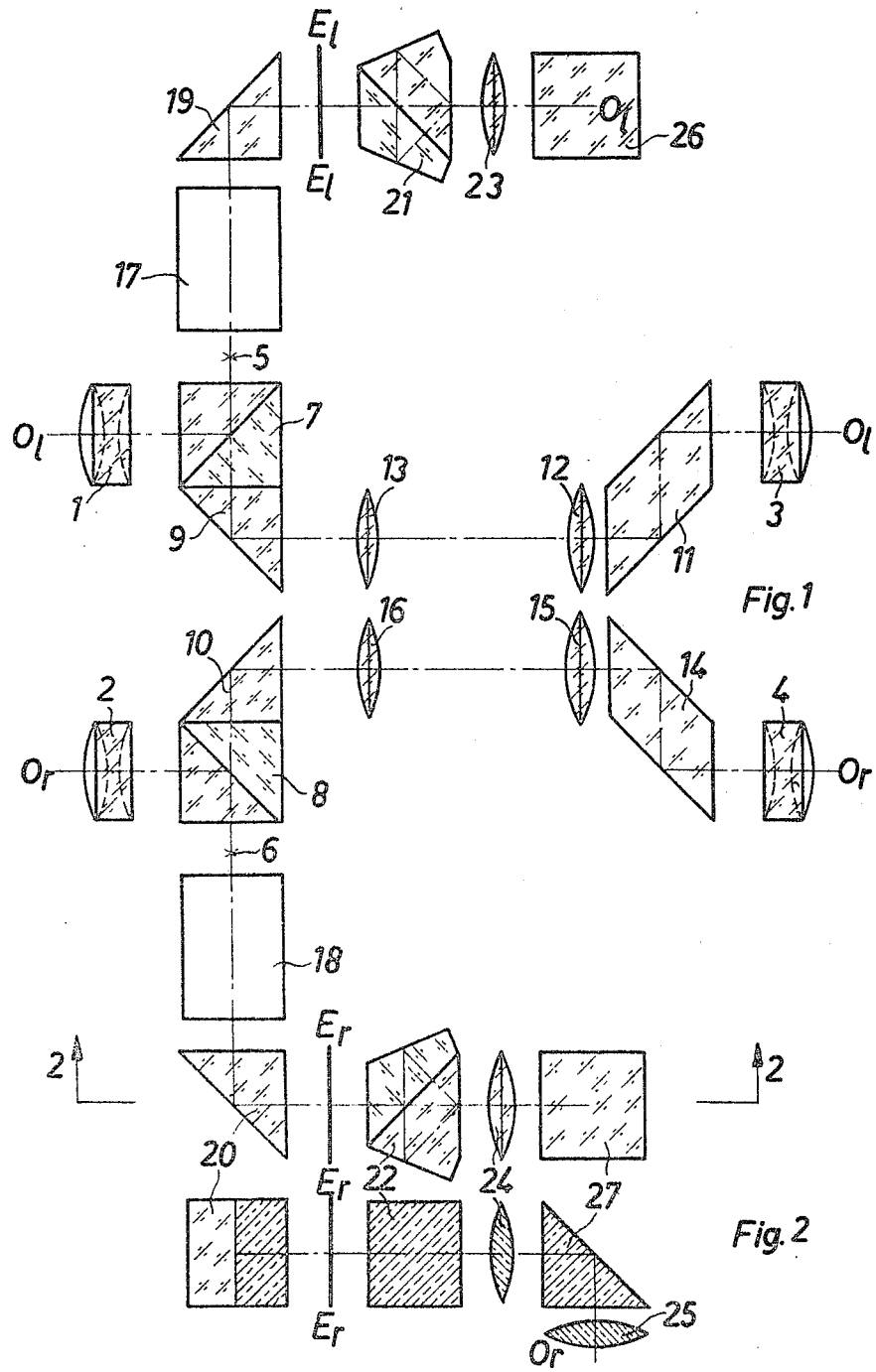

3,464,759
STEREOSCOPIC OBSERVATION DEVICES
Horst Schöler and Klaus Herda, Jena, Germany, assignors to VEB Carl Zeiss Jena, Jena, Germany
Filed Dec. 2, 1965, Ser. No. 545,778
Int. Cl. G02b 21/22
U.S. Cl. 350—36                                                 4 Claims

ABSTRACT OF THE DISCLOSURE

A stereomicroscope, particularly for photogrammetry, comprises two pairs of eyepieces and two objectives. Between the one objective and one eyepiece of the one pair is located a beam splitter for the beam from the said one objective, and between the other objective and one eyepiece of the other pair is located a beam splitter for the beam from the said other objective. The remaining two eyepieces of the two pairs respectively receive the split-off parts of the two beams so that stereoscopic observation and measurement is possible for two observers at one and the same time.

---

This invention relates to a device for the stereoscopic observation of a pair of images or an object by two persons simultaneously viewing through respectively two pairs of eyepieces.

Some known devices for the stereoscopic observation of objects or pairs of images comprise a double eyepiece and a double objective. Such devices apart from complicated and rather bulky construction suffer from the additional disadvantage of difficulties in the reciprocal orientation and the operation of the two binocular viewing systems and in the focusing of these systems on exactly the same object points. These difficulties are all the more noticeable if the two systems are entirely independent of each other.

It is known so to interpose a single eyepiece in one of the ray paths of a stereomicroscope or a binocular telescope that another person can simultaneously view the image sector seen by the stereoscopically viewing observer, but the fact of this other person being compelled to forego the illusion of depth often proves a serious handicap in both teaching and interpretation.

The present invention aims at obviating the foregoing disadvantages by providing a stereoscopic observation device which offers a stereoscopic view of an object or image to two persons at one and the same time and distinguishes itself by simple construction and economy of material.

To this end the stereoscopic observation device is characterized in that the two pairs of eyepieces are associated with only one pair of objectives and that each objective is associated with a beam splitter, each beam splitter being interposed at any desired place between the objective and the respective eyepieces.

If the device has an optical system for changing the magnification (pancreatic system), it is advantageous to provide that the beam splitter is interposed between the optical system and the respective eyepieces, so that a change in the magnification is simultaneously and uniformly effective in the observation ray paths of both observers. It is advisable not to couple the pancreatic systems to each other, so that in the observation system one magnification can be adjusted for the left eyes and another for the right eyes of the two observers. The device can be focused by means of the eyepieces or the objectives or by means of special focusing elements in the paths of observation rays.

The device may have measuring marks at any suitable place in the observation ray paths. Providing and adjusting these marks is easiest if each observation ray-path between the pancreatic system and the ray splitter contains only one such mark.

Each observation ray path between the objective and the pancreatic system may contain the plane of an intermediate image of the image under observation. In this plane, or a plane conjugate to it, special auxiliary measuring means, for example glass wedges or measuring grids of the kind used in forestry for establishing the heights of trees and tree tops, can be introduced into the observation ray paths.

To counteract swings of the images of the viewed stereo pair, an optical element such as a Schmidt or Amici prism may be interposed for image rotation in each observation ray path.

In order that the invention may be more readily understood, reference is made to the accompanying drawings which illustrate diagrammatically and by way of example one embodiment of the invention, and in which FIG. 1 shows the optical parts in plan view, and
FIG. 2 shows a section through the line 2—2 in FIG. 1.

In the drawings, the stereoscopic observation system has a bent axis $O_l$—$O_l$ containing eyepieces 1 and 3, and a bent axis $O_r$—$O_r$ containing eyepieces 2 and 4. The image planes of the eyepieces 1 and 2 respectively contain measuring marks 5 and 6. Between the eyepiece 1 and the mark 5 is disposed a ray splitter 7, and between the eyepiece 2 and the mark 6 is disposed a ray splitter 8. To the ray splitters 7, 8 are respectively cemented right-angled prisms 9 and 10. A rhombic prism 11, a lens system 12, 13 and the right-angled prism 9 direct the observation ray path of the eyepiece 3 to the ray splitter 7, which combines this day path with that of the eyepiece 1 in the plane of the mark 5. A rhombic prism 14, a lens system 15, 16 and the right-angled prism 10 direct the observation ray path of the eyepiece 4 to the ray splitter 8, which combines this ray path with that of the eyepiece 2 in the plane of the mark 6.

The marks 5 and 6 lie respectively at the foci of pancreatic systems in mounts 17 and 18, by means of which systems the magnification of the observation systems can be changed. Two right-angled prisms 19 and 20 respectively bend the optical axes $O_l$—$O_l$ and $O_r$—$O_r$ and direct the observation beams respectively to Schmidt prisms 21 and 22. These Schmidt prisms are rotatable about the optical axes traversing them. Between the right-angled prism 19 and the Schmidt prism 21 lies an intermediate image plane $E_l$—$E_l$, and between the right-angled prism 20 and the Schmidt prism 22 lies an intermediate image plane $E_r$—$E_r$. The planes $E_l$—$E_l$ and $E_r$—$E_r$, which may contain auxiliary measuring means (not shown), coincide with the focal planes of lenses 23 and 24. Between the lens 24 and an objective 25 (FIG. 2) conjugate to it is disposed a right-angled prism 27, which gives the axis $O_r$—$O_r$ an additional bend, and between the lens 23 and an objective (not shown) conjugate to it is disposed a right-angled prism 26, which gives the axis $O_l$—$O_l$ an additional bend. The objective 25 and the not shown objective are displaceable along their optical axes. The front focal planes of these objectives contain the stereoscopic images (not shown).

We claim:
1. A device for stereoscopic observation of a pair of stereoscopic images by two persons at one and the same time, having two pairs of eyepieces, one of said eyepiece pairs being for the observation of said images by one of said persons utilizing both eyes and the other of said eyepiece pairs being for the observation of said images by said other person utilizing both eyes, comprising a single objective pair, a pair of beam splitters for splitting a beam of light incident thereon into two components, means for directing the observation rays of one of said objectives to one of said pair of beam splitters and having means for directing the observation rays of said other objective to said other beam splitter, said ray directing means directing said rays in such a manner as to be incident on said beam splitters for splitting the same into said two components, means for directing said components from one of said beam splitters to one eyepiece of each of said two eyepiece pairs, means for directing the components from said other beam splitters to the other eyepiece of said two eyepiece pairs, whereby each of said components is observable simultaneously by said two observers, and means for changing the magnification of said images, said magnification means being located in the path of each of said observation rays of said device between each of said objectives and beam splitters.

2. A device as claimed in claim 1, wherein, one of said pair of beam splitters is located in the observation ray path between each of the adjacent magnification means and said eyepiece pairs.

3. A device as claimed in claim 1, wherein said planes contain measuring marks.

4. A device as claimed in claim 1, having means for rotating said images whereby said stereoscopic images of said eyepiece pairs will be approximately identical as viewed by said persons.

References Cited

UNITED STATES PATENTS

| | | | |
|---|---|---|---|
| 983,569 | 2/1911 | Rohr | 350—35 X |
| 1,798,396 | 3/1931 | Bauersfeld et al. | 350—36 |
| 2,401,709 | 6/1946 | Mihalyi et al. | 88—2.7 |
| 2,634,654 | 4/1953 | Bauersfeld | 350—35 X |
| 2,857,523 | 10/1958 | Corso | 350—33 X |
| 3,062,099 | 11/1962 | French | 350—36 X |
| 3,170,983 | 2/1965 | Riedel | 350—31 X |
| 3,186,300 | 6/1965 | Littman | 350—36 X |

FOREIGN PATENTS

| | | |
|---|---|---|
| 135,651 | 4/1960 | U.S.S.R. |
| 1,273,776 | 9/1961 | France. |

DAVID SCHONBERG, Primary Examiner

PAUL R. GILLIAM, Assistant Examiner

U.S. Cl. X.R.

350—37, 49, 50